US009611761B2

(12) United States Patent
Brunhuber et al.

(10) Patent No.: US 9,611,761 B2
(45) Date of Patent: Apr. 4, 2017

(54) HIGH-TEMPERATURE ENERGY STORE WITH RECUPERATOR

(75) Inventors: Christian Brunhuber, Auerbach (DE); Carsten Graeber, Erlangen (DE); Gerhard Zimmermann, Hochstadt/Aisch (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 286 days.

(21) Appl. No.: 14/358,150

(22) PCT Filed: Sep. 7, 2012

(86) PCT No.: PCT/EP2012/067493
§ 371 (c)(1),
(2), (4) Date: May 14, 2014

(87) PCT Pub. No.: WO2013/072085
PCT Pub. Date: May 23, 2013

(65) Prior Publication Data
US 2014/0298813 A1     Oct. 9, 2014

(30) Foreign Application Priority Data

Nov. 15, 2011   (DE) .................. 10 2011 086 374

(51) Int. Cl.
*F01K 3/12*     (2006.01)
*F01K 3/00*     (2006.01)
(Continued)

(52) U.S. Cl.
CPC .................. *F01K 3/12* (2013.01); *F01K 3/00* (2013.01); *F01K 3/006* (2013.01); *F01K 7/16* (2013.01);
(Continued)

(58) Field of Classification Search
CPC ... F01K 3/00; F01K 3/006; F01K 3/12; F01K 23/02; F01K 13/00; F01K 13/006; Y02E 70/30
See application file for complete search history.

(56) References Cited

U.S. PATENT DOCUMENTS

| 4,192,144 A * | 3/1980 | Pierce | F01K 3/00 |
| | | | 122/28 |
| 2008/0022683 A1* | 1/2008 | Ohler | F02C 6/14 |
| | | | 60/641.8 |

(Continued)

FOREIGN PATENT DOCUMENTS

| CH | WO 2011045282 A2 * | 4/2011 | ............. F01K 3/006 |
| DE | 102008039449 A1 | 3/2010 | |

(Continued)

*Primary Examiner* — Thomas Denion
*Assistant Examiner* — Xiaoting Hu
(74) *Attorney, Agent, or Firm* — Beusse Wolter Sanks & Maire

(57) ABSTRACT

A charging circuit for converting electrical energy into thermal energy is provided, having a compression stage, connected via a shaft to an electric motor, a heat exchanger and an expansion stage, which is connected via a shaft to a generator, wherein the compression stage is connected to the expansion stage via a hot-gas line, and the heat exchanger is connected on the primary side into the hot-gas line, wherein the expansion stage is connected via a return line to the compression stage, so that a closed circuit for a working gas is formed. A recuperator is also provided which, on the primary side, is connected into the hot-gas line between the heat exchanger and the expansion stage and, on the secondary side, is connected into the return line, so that heat from the working gas in the hot-gas line can be transferred to the working gas in the return line.

18 Claims, 3 Drawing Sheets

(51) Int. Cl.
  *F01K 13/00* (2006.01)
  *F01K 23/02* (2006.01)
  *F01K 7/16* (2006.01)

(52) U.S. Cl.
  CPC ............ *F01K 13/00* (2013.01); *F01K 13/006* (2013.01); *F01K 23/02* (2013.01); *Y02E 70/30* (2013.01)

(56) References Cited

U.S. PATENT DOCUMENTS

| | | | |
|---|---|---|---|
| 2009/0120092 A1 | 5/2009 | Li | |
| 2010/0218500 A1* | 9/2010 | Ruer | F01K 3/12 60/659 |
| 2010/0251711 A1* | 10/2010 | Howes | F01K 3/12 60/659 |
| 2010/0301614 A1* | 12/2010 | Ruer | F01K 3/12 290/1 A |
| 2011/0014812 A1 | 1/2011 | Loukusa | |
| 2011/0100611 A1* | 5/2011 | Ohler | F01K 3/00 165/104.28 |
| 2012/0222423 A1* | 9/2012 | Mercangoez | F01K 3/006 60/645 |

FOREIGN PATENT DOCUMENTS

| | | |
|---|---|---|
| JP | 2000297657 A | 10/2000 |
| WO | 2007137373 A1 | 12/2007 |
| WO | 2010081883 A2 | 7/2010 |

* cited by examiner

HIGH-TEMPERATURE ENERGY STORE WITH RECUPERATOR

CROSS REFERENCE TO RELATED APPLICATIONS

This application is the US National Stage of International Application No. PCT/EP2012/067493 filed Sep. 7, 2012, and claims the benefit thereof. The International Application claims the benefit of German Application No. DE 10 2011 086 374.5 filed Nov. 15, 2011. All of the applications are incorporated by reference herein in their entirety.

FIELD OF INVENTION

The invention relates to an efficient high-temperature energy store in which thermal energy can be stored by means of recuperation of the compressor waste heat during the air charging cycle.

BACKGROUND OF INVENTION

The requirement for storing energy results especially from the steadily increasing proportion of power plants from the renewable energies sector. It is the aim of energy storage in this case to utilize the power plants with renewable energies in power transmission networks in such a way that renewably generated energy can also be accessed in a time-delayed manner in order to thus save on fossil energy carriers and therefore to save on $CO_2$ emissions.

On account of the time interval which an energy store has to bridge, that is to say the time over which energy is stored in, and extracted from, the energy store, and on account of the capacity which it is required to store, correspondingly high demands are made upon the dimensions of thermal energy stores. On account of the overall size alone, thermal energy stores can therefore become very expensive in their acquisition. If the energy store in addition is of a costly design, or the actual thermal storage medium is expensive in its acquisition or costly in operation, the acquisitioning and operating costs for a thermal energy store can quickly raise doubts over the economical efficiency of energy storage.

So that the production costs for the energy store are affordable, inexpensive storage material is preferred. The heat exchanger should also be dimensioned as most cost-effectively as possible. On account of the often low thermal conductivity of the inexpensive storage materials, the heat exchanger surfaces are often to be of a very large design, however. The large number and long length of the heat exchanger tubes can greatly increase the costs of the heat exchanger in this case, which can no longer be compensated even by an inexpensive storage material.

Up to now, heat exchangers have been designed on the basis of inexpensive materials, chiefly in the form of a direct exchange of the heat transfer medium and the storage material, such as sand or stones, in order to replace large heat exchangers. As heat transfer medium, a working gas, such as air, is used. The working gas in this case can be conducted selectively in a closed or in an open charging circuit or auxiliary circuit.

The fluidized bed technology which is known in principle in engineering has not been used up to now in an order of magnitude which would be necessary for a seasonal storage of renewable surplus energies. A direct heat exchange, moreover, involves a relatively complicated handling of the solid material, which is not economical for a large store.

High capacitive energy stores exist today mainly in the form of pumped-storage power plants and compressed air storage power plants. As a result of the limited extension potential of these stores in many regions, many other storage technologies are in development.

A generic-type energy store can be gathered from WO 2007/137373, for example.

SUMMARY OF INVENTION

It is an object of the invention to disclose an inexpensive energy storage device, for storing thermal energy on the basis of inexpensive storage materials, which has improved efficiency. In this case, it is particularly necessary to avoid the disadvantages from the prior art. It is, moreover, an object of the invention to disclose a method by means of which with improved efficiency thermal energy can be stored in inexpensive storage materials.

The object of the invention which is directed towards a device is achieved by means of the features of the independent claim. The charging circuit for converting electric energy into thermal energy comprises a compression stage, which is connected via a shaft to an electric motor, a heat exchanger and an expansion stage, which is connected via a shaft to a generator. The compression stage is connected to the expansion stage via a hot gas line. The heat exchanger is connected on the primary side into the hot gas line, and the expansion stage is connected to the compression stage via a return line. As a result, a closed circuit for a working gas is formed. According to aspects of the invention, provision is now also made for a recuperator which is connected on the primary side into the hot gas line between the heat exchanger and the expansion stage and on the secondary side is connected into the return line so that heat of the working gas in the hot gas line can be transferred to the working gas in the return line.

The invention now takes advantage of the fact that although only some of the available thermal energy is stored, the overall balance of the energy storage is shifted to the benefit of increased efficiency. This is explained by the fact that on the one hand a device for heating, reheating or dewatering of the expansion air, which otherwise has a negative effect upon the efficiency, can be dispensed with. As a result of the expansion to approximately ambient pressure and ambient temperature, the problem of condensation of water, even when using moist intake air for the compressor, is advantageously avoided. Therefore, in the case of the method according to the invention no damage can occur as a result of frozen condensate. A condenser can also be dispensed with.

The expansion turbine, moreover, reduces the energy expenditure for compression by it being arranged on the same shaft as the compressor, and also substantially assists the compressor.

Since cooling of the working gas at low temperatures requires very large heat exchanger surfaces, by dispensing with the utilization of lower temperatures the thermal store can also turn out to be more favorable since the heat exchanger can be of smaller dimensions.

Moreover, on account of the compressor waste heat in the charging circuit (efficient compression to high temperature levels), the recuperator achieves a thermal pump efficiency of considerably more than 100%.

The recuperation of the compressor waste heat is made possible by the fact that only high-temperature heat, e.g. >350° C., is used in the thermal store. Heat at a lower temperature level is used for preheating at the compressor inlet, as a result of which the electric power requirement of the quasi-adiabatic compression is reduced and high thermal pump efficiency is made possible.

The step according to the invention lies in the realization of the charging cycle and of the thermal store. On account of the use of a high-temperature store with approximately T>350° C., the low-temperature waste heat from the air compression can be used for preheating the compressor air (recuperation). In this way, a charging cycle with high thermal pump efficiency is produced.

As a result of the fact that working gas is not appreciably cooled down when leaving the expansion stage, but only features temperatures of just below 0° C., conventional compressors can be used as the expansion stage. At very low discharge temperatures, specially configured compressors are otherwise required.

An inert gas can be used in the circuit. The temperature T3 and the pressure P3 are preferably set in this case by the dimensioning of the heat exchange process, and especially by the size of the heat exchanger surface in the process. Since the working gas needs to yield only some of its thermal energy via the heat exchanger to the thermal store, the size of the heat exchanger surface can be significantly reduced. As a result, a considerable saving can be made in costs for the acquisition of the thermal store.

The heat exchange during the recuperation can be carried out either directly in an air to air heat exchanger or by means of an intermediate circuit with an efficient heat transfer medium (e.g. thermal oil). In the description of the heat transfer, within the scope of the invention, the primary side is defined as the heat yielding side, and the secondary side is defined as the heat absorbing side.

In the thermal store, on account of the higher efficiency potential, a direct temperature exchange with the hot air (during charging) and the water (during discharging) with the storage material is preferred (direct charging of the thermal store without separate air circuit, see figures).

The charging circuit can be a component part of a heater, wherein the heater is connected on the secondary side into the heat exchanger so that heat can be transferred by means of the heater, via the heat exchanger, to a medium which is to be heated.

An ambient air heat exchanger, by means of which the working gas which is conducted in the return line can be heated to outside temperature, is advantageously connected into the return line. On account of the recuperation of the compressor waste heat in the charging circuit (efficient compression to high temperature levels) and of the heating up of the expansion air (introduction of ambient heat), a thermal pump efficiency of considerably more than 100° is achieved and therefore is significantly superior to concepts with an electric heater.

In an advantageous embodiment, the charging circuit is a component part of an energy storage device which furthermore has a thermal store and a discharging circuit, wherein the secondary side of the heat exchanger is connected to the primary side of the thermal store via a gas line so that heat of the working gas can be transferred from the circuit indirectly via the heat exchanger (5) into the thermal store. Alternatively to this, the charging circuit can be a component part of an energy storage device which furthermore has a thermal store and a discharging circuit, wherein the heat exchanger is a thermal store so that the working gas flows from the circuit through the thermal store, and consequently the heat from the working gas can be transferred directly to the thermal store.

The discharging circuit comprises a steam generator, a steam turbine, a generator and a condenser, wherein the steam turbine is connected via a shaft to the generator, and the steam generator, the steam turbine and the condenser are connected into a water-steam cycle, wherein the primary side of the steam generator is connected via a steam line to the secondary side of the thermal store. Alternatively to this, the discharging circuit can comprise a steam generator, a steam turbine, a generator and a condenser, wherein the steam turbine is connected via a shaft to the generator, and the steam generator, the steam turbine and the condenser are connected into a water-steam cycle. In this case, the steam generator is the thermal store so that by introducing water steam can be generated directly in the thermal store.

In an advantageous development, an electric auxiliary heater is connected into the hot gas line upstream of the thermal store. As a result of this optional measure, a further increase of the efficiency can be realized by raising the maximum storage temperature in the form of an electric auxiliary heater upstream of the thermal store.

The compression stage and the expansion stage are advantageously interconnected via a shaft.

In an advantageous development, the compression stage comprises a plurality of compressor stages, wherein a heat exchanger is connected downstream to each compressor stage in each case.

Therefore, a first heat exchanger is connected downstream to at least a first compressor stage and a second heat exchanger is connected downstream to a second compressor stage. Moreover, the expansion stage can comprise a plurality of expansion stages, wherein an ambient air heat exchanger is connected downstream to each expansion stage so that a first ambient air heat exchanger is connected downstream to at least a first expander stage, and a second ambient air heat exchanger is connected downstream to a second expander stage. The precise number of compressor and expander stages (in the layout, an example with two compressor stages and two expander stages is shown) can be freely selected and has to be optimized according to the techno economic points of view.

The expansion energy which is released during the expansion process is advantageously transferred to the compressor process. Therefore, the energy, which was not transferred in the form of heat to the thermal store, makes a noticeable contribution to the compression of the working gas.

The thermal energy can be the seasonally arising surplus energy of a power plant with renewable energies. As storage material for the thermal store of the heat exchange process, porous materials, sand, clay, stones, concrete, water or saline solution are especially suitable.

The invention solves the problem of an efficient energy storage for surplus current in the form of heat. The high efficiency is based on high thermal pump efficiency of considerably more than 100% and therefore is significantly superior to concepts with an electric heater.

DETAILED DESCRIPTION OF INVENTION

Figure 1:
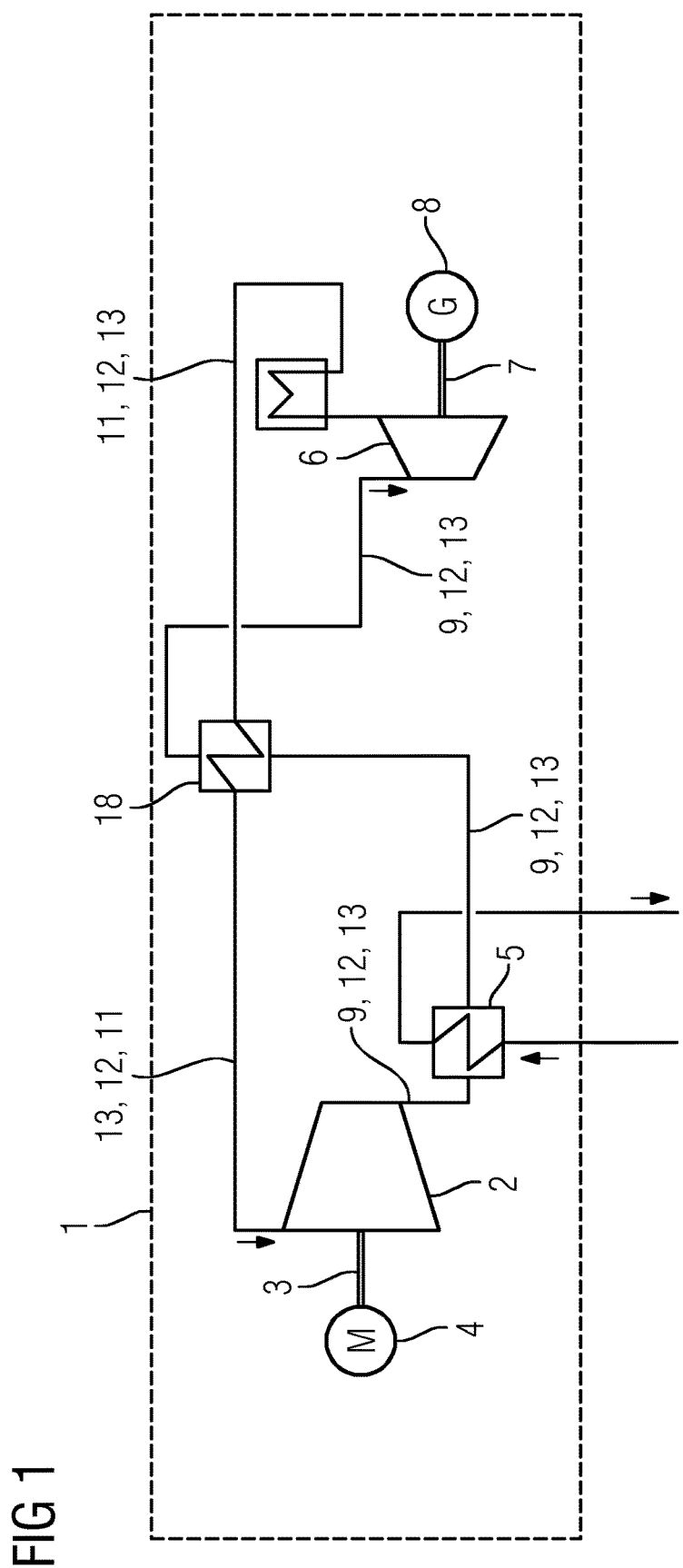
FIG. 1 shows an example of a charging circuit for converting electrical energy into thermal energy according to aspects of the invention.

FIG. 1 shows an example of a charging circuit 1 for converting electrical energy into thermal energy, having a compression stage 2, which is connected via a shaft 3 to an electric motor 4, a heat exchanger 5 and an expansion stage 6, which is connected via a shaft 7 to a generator 8, wherein the compression stage 2 is connected to the expansion stage 6 via a hot-gas line 9, and the heat exchanger 5 is connected on the primary side into the hot-gas line 9, wherein the expansion stage 6 is connected via a return line 11 to the compression stage 2, so that a closed circuit 12 for a working gas 13 is formed, wherein, furthermore, a recuperator 18 is provided which, on the primary side, is connected into the hot-gas line 9 between the heat exchanger 5 and the expansion stage 6 and, on the secondary side, is connected into the return line 11, so that heat from the working gas 13 in the hot-gas line 9 can be transferred to the working gas 13 in the return line 11. The charging circuit 1 may be a component part of a heater, wherein the heater is connected on the secondary side into the heat exchanger 5 so that heat can be transferred by means of the heater, via the heat exchanger 5, to a medium which is to be heated.

Figure 2:
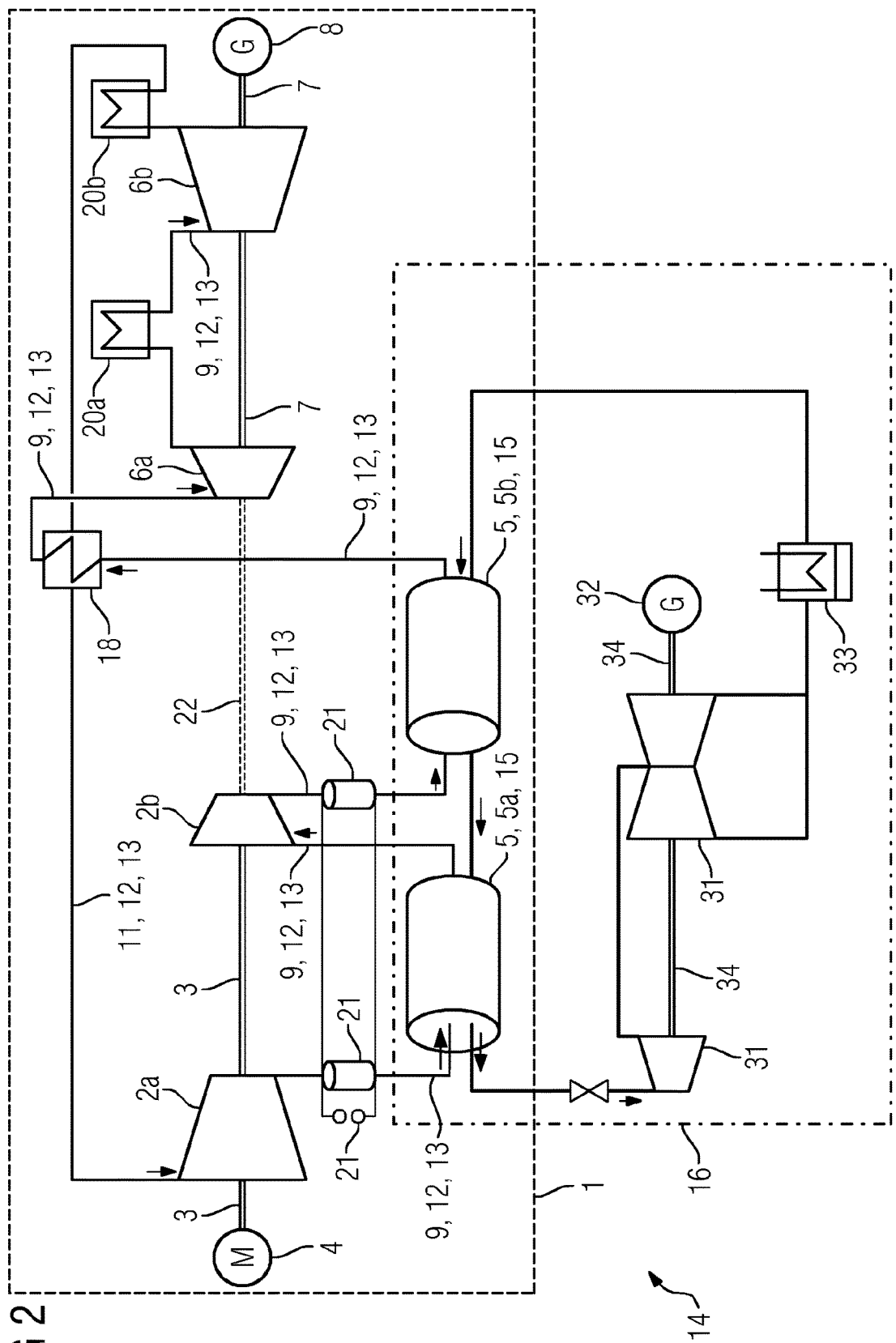
FIGS. 2-3 show examples of a charging circuit as a component part of an energy storage device which has a thermal store and a discharging circuit according to aspects of the invention.
Figure 3:
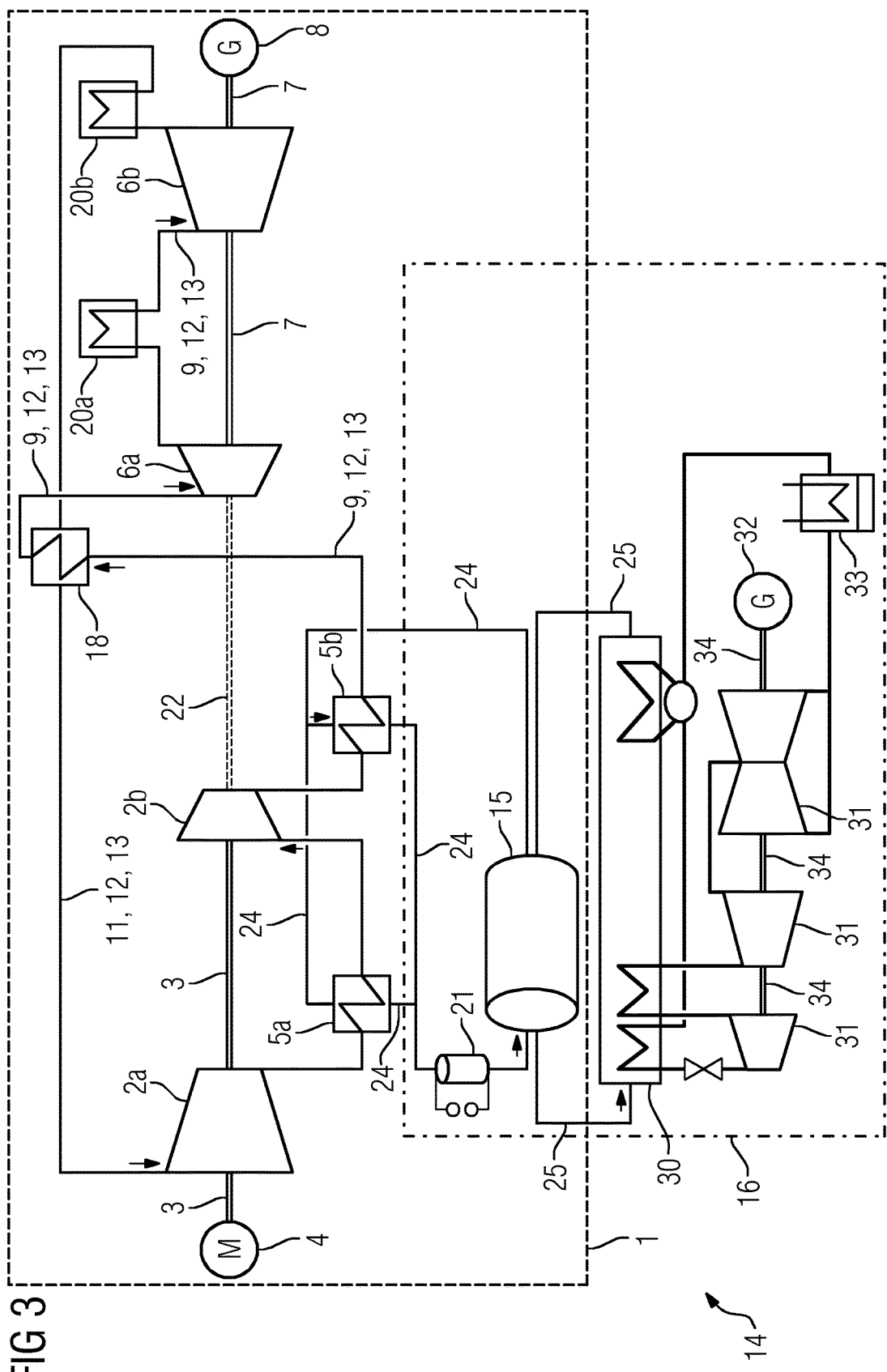

FIGS. 2-3 show an example of a charging circuit 1 as a component part of an energy storage device 14 which has a thermal store 15 and a discharging circuit 16. An ambient air heat exchanger 20a, 20b may be connected into the return line 11, by means of which the working gas 13 which is conducted in the return line 11 can be heated to outside temperature.

The secondary side of the heat exchanger 5 may be connected to the primary side of the thermal store 15 via a gas line 24 so that heat of the working gas 13 can be transferred from the circuit 12 via the heat exchanger 5 indirectly into the thermal store 15.

The heat exchanger 5 may be the thermal store 15 so that the working gas 13 flows from the circuit 12 through the thermal store 15, and consequently the heat from the working gas 13 can be transferred directly to the thermal store 15.

The discharging circuit 16 may further include a steam generator 30, a steam turbine 31, a generator 32 and a condenser 33, wherein the steam turbine 31 is connected via shaft 34 to the generator 32, and the steam generator 30, the steam turbine 31 and the condenser 33 are connected into a water-steam cycle 35, wherein the primary side of the steam generator 30 is connected via a steam line 25 to the secondary side of the thermal store 15.

The steam generator 30 may be the thermal store 15 so that by introducing water steam can be generated directly in the thermal store 15.

In a further embodiment, an electric auxiliary heater 21 may be connected into the hot gas line 9 upstream of the thermal store 15. Moreover, the compression stage 2 and the expansion stage 6 may be interconnected via a shaft 22.

In still further embodiments, the compression stage 2 may have a plurality of compressor stages and a heat exchanger 5 is connected downstream to each compressor stage in each case so that a first heat exchanger 5a is connected downstream to at least a first compressor stage 2a and a second heat exchanger 5b is connected downstream to a second compressor stage 2b. The expansion stage 6 may further include a plurality of expansion stages and an ambient air heat exchanger 20a, 20b is connected downstream to each expansion stage so that a first ambient air heat exchanger 20a is connected downstream to at least a first expander stage 6a and a second ambient air heat exchanger 20b is connected downstream to a second expander stage 6b.

As a method, an embodiment herein includes generating thermal energy, in which in a charging process: a) in a compression process, a working gas 13 is compressed from a temperature T1 and a pressure P1 to a pressure P2 with a temperature T2, b) in a heat exchange process, heat is transferred from the working gas 13 to a thermal store 15, as a result of which temperature and pressure of the working gas 13 are reduced to a temperature T3 and a pressure P3, and c) in an expansion process, the working gas 13 is expanded to a pressure P4 with a temperature T4, and the expanded working gas 13 is fed back again in a return line to the compression process, wherein heat is extracted from the working gas between the heat exchange process and the expansion process and is transferred to the working gas in the return line. The temperature T3 and the pressure P3 may be set by the dimensioning of the heat exchange process. The compression process may be driven by electrically seasonally arising surplus energy of a power plant with renewable energies. As storage material for the thermal store of the heat exchange process porous materials, sand, clay, stones, concrete, water or saline solution may be used.

The invention claimed is:

1. A system comprising a charging circuit for converting electric energy into thermal energy, the charging circuit comprising:
   a compression stage, which is connected via a motor shaft to an electric motor, a Heat exchanger and an expansion stage, which is connected via a charging circuit generator shaft to a charging circuit generator, wherein the compression stage is connected to the expansion stage via a hot gas line, and the heat exchanger is connected on the primary side into the hot gas line, and wherein the expansion stage is connected to the compression stage via a return line so that a closed circuit for a working gas is formed, and
   a recuperator which is connected on the primary side into the hot gas line between the heat exchanger and the expansion stage and connected on the secondary side into the return line so that heat of the working gas in the hot gas line can be transferred to the working gas in the return line,
   the system further comprising a discharging circuit that is discrete from the charging circuit and which comprises: a thermal store that receives heat from the charging circuit; a medium that receives heat from the thermal store; and a discrete energy extractor that extracts the received heat from the medium,
   wherein the thermal store receives the heat from the working gas in the charging circuit, and wherein the heat exchanger is configured such that a pressure of the working gas is reduced when delivering the heat to the thermal store.

2. The system as claimed in claim 1, the charging circuit further comprising
   an ambient air heat exchanger connected into the return line, by means of which the working gas which is conducted in the return line can be heated to outside temperature.

3. The system as claimed in claim 1,
   wherein a secondary side of the heat exchanger is connected to a primary side of the thermal store via a gas line so that the heat from the charging circuit can be transferred from the charging circuit via the heat exchanger indirectly into the thermal store.

4. The system as claimed in claim 1,
   wherein the thermal store comprises the heat exchanger so that the working gas flows from the charging circuit through the thermal store, and consequently the heat from the working gas can be transferred directly to the thermal store.

5. The system as claimed in claim 4,
wherein the discrete energy extractor comprises a steam turbine,
wherein the discharging circuit further comprises a steam generator, a discharging circuit generator, and a condenser,
wherein the steam turbine is connected via a discharging circuit generator shaft to the discharging circuit generator, and wherein the steam generator, the steam turbine and the condenser are connected into a water-steam cycle, and
wherein a primary side of the steam generator is connected via a steam line to a secondary side of the thermal store.

6. The system as claimed in claim 4,
wherein the discrete energy extractor comprises a steam turbine,
wherein the discharging circuit further comprises a steam generator, a discharging circuit generator and a condenser,
wherein the steam turbine is connected via a discharging circuit generator shaft to the discharging circuit generator, and wherein the steam generator, the steam turbine and the condenser are connected into a water-steam cycle, and
wherein the steam generator is the thermal store so that by introducing water steam can be generated directly in the thermal store.

7. The system as claimed in claim 1, the charging circuit further comprising an electric auxiliary heater connected into the hot gas line upstream of the thermal store.

8. The system as claimed in claim 1, wherein the compression stage and the expansion stage are interconnected via a charging circuit interconnecting shaft.

9. The system as claimed in claim 1,
wherein the compression stage comprises a plurality of compressor stages and a respective heat exchanger is connected downstream to each compressor stage in each case so that a first heat exchanger is connected downstream to at least a first compressor stage and a second heat exchanger is connected downstream to a second compressor stage.

10. The system as claimed in claim 1,
wherein the expansion stage comprises a plurality of expansion stages and a respective ambient air heat exchanger is connected downstream to each expansion stage so that a first ambient air heat exchanger is connected downstream to at least a first expander stage and a second ambient air heat exchanger is connected downstream to a second expander stage.

11. The system as claimed in claim 1,
wherein the system is used in a power plant, which is operated with renewable energy, for storing seasonal electric surplus energy.

12. The system as claimed in claim 1,
wherein the thermal store contains a porous storage medium, sand, clay, stones, or concrete.

13. The system as claimed in claim 1, wherein the charging circuit is configured to heat the thermal store to over 350° C.

14. The system as claimed in claim 1, wherein the discharging circuit does not include heat transfer from the medium at one location in the discharging circuit to the medium at another location in the discharging circuit.

15. A method, comprising:
a) in a compression process in a charging circuit, compressing a working gas from a temperature T1 and a pressure P1 to a pressure P2 with a temperature T2,
b) in a heat exchange process in the charging circuit, transferring heat from the working gas to a thermal store in a discrete discharging circuit, as a result of which temperature and pressure of the working gas are reduced to a temperature T3 and a pressure P3, and
c) in an expansion process in the charging circuit, expanding the working gas to a pressure P4 with a temperature T4, and feeding the expanded working gas back again in a return line to the compression process,
wherein in the charging circuit heat is extracted from the working gas between the heat exchange process and the expansion process and is transferred to the working gas in the return line,
the method further comprising:
transferring heat from the thermal store to a medium in the discharging circuit; and
extracting the transferred heat from the medium via a discrete energy extractor of the discharging circuit.

16. The method as claimed in claim 15, wherein the heat exchange process comprises a heat exchanger, and the temperature T3 and the pressure P3 are set by dimensions of the heat exchanger.

17. The method as claimed in claim 15, further comprising
driving the compression process by electrically seasonally arising surplus energy of a power plant with renewable energies.

18. The method as claimed in claim 15, further comprising using as storage material for the thermal store of the heat exchange process porous materials, sand, clay, stones, concrete, water or saline solution.

* * * * *